United States Patent
Katsumata

(10) Patent No.: US 6,796,180 B2
(45) Date of Patent: Sep. 28, 2004

(54) ANGULAR VELOCITY SENSOR

(75) Inventor: Takashi Katsumata, Kariya (JP)

(73) Assignee: Denso Corporation, Kariya (JP)

(*) Notice: Subject to any disclaimer, the term of this patent is extended or adjusted under 35 U.S.C. 154(b) by 4 days.

(21) Appl. No.: 10/118,931

(22) Filed: Apr. 10, 2002

(65) Prior Publication Data
US 2002/0178814 A1 Dec. 5, 2002

(30) Foreign Application Priority Data
Apr. 11, 2001 (JP) ....................... 2001-113081

(51) Int. Cl.[7] ............................................. G01P 15/00
(52) U.S. Cl. ....................... 73/504.14; 73/497; 73/1.38
(58) Field of Search ....................... 73/504.14, 504.12, 73/497, 1.37, 1.38, 504.16

(56) References Cited

U.S. PATENT DOCUMENTS 5,824,900 A * 10/1998 Konno et al. ............ 73/504.16

2003/0084722 A1 * 5/2003 Kim et al. ................ 73/504.12

FOREIGN PATENT DOCUMENTS

JP          A-10-96633          4/1998

* cited by examiner

Primary Examiner—Hezron Williams
Assistant Examiner—Nashmiya Fayyaz
(74) Attorney, Agent, or Firm—Posz & Bethards, PLC

(57) ABSTRACT

An improved vibration type angular velocity sensor suppresses temperature variation of the sensitivity in the atmosphere. When the vibrator 31 is subjected to an angular velocity $\Omega$ while it is in a driving vibration, it produces a detecting vibration in a direction perpendicular to the direction of the driving vibration. Angular velocity detection is based on a change in capacitance between a comb-like portion 36 of the vibrator 31 and a detecting electrode 50. A relationship between a degree of detuning $\alpha = f_d/f_s$, where $f_d$ is the resonance frequency in the driving vibration mode and $f_s$ is the resonance frequency in the detecting vibration mode, and a value Qs in the detecting vibration mode is given. The term Qs is a function of the mass of the vibrator, a spring constant of springs supporting the vibrator, and an attenuation coefficient.

4 Claims, 4 Drawing Sheets

FIG. 3

| | fd(Hz) | fs(Hz) | Qs | β | Δβ | RATE OF CHANGE OF β | α |
|---|---|---|---|---|---|---|---|
| −40°C | 5000 | 9650 | 3.75 | 1.3432 | 0.0128 | 0.9641 | |
| RT | 5000 | 9650 | 3 | 1.3304 | | | 1.93 |
| 85°C | 5000 | 9650 | 2.55 | 1.3171 | −0.0133 | −0.9988 | |
| −40°C | 5000 | 7070 | 7.5 | 1.9659 | 0.0187 | 0.9619 | |
| RT | 5000 | 7070 | 6 | 1.9472 | | | 1.414 |
| 85°C | 5000 | 7070 | 5.1 | 1.9278 | −0.0194 | −0.9965 | |
| −40°C | 5000 | 6170 | 12.5 | 2.8623 | 0.0273 | 0.9638 | |
| RT | 5000 | 6170 | 10 | 2.8350 | | | 1.234 |
| 85°C | 5000 | 6170 | 8.5 | 2.8067 | −0.0283 | −0.9985 | |
| −40°C | 5000 | 5560 | 25 | 5.1375 | 0.0486 | 0.9560 | |
| RT | 5000 | 5560 | 20 | 5.0889 | | | 1.112 |
| 85°C | 5000 | 5560 | 17 | 5.0384 | −0.0504 | −0.9905 | |
| −40°C | 5000 | 5366.5 | 37.5 | 7.4492 | 0.0707 | 0.9588 | |
| RT | 5000 | 5366.5 | 30 | 7.3784 | | | 1.0733 |
| 85°C | 5000 | 5366.5 | 25.5 | 7.3051 | −0.0733 | −0.9934 | |
| −40°C | 5000 | 5217 | 62.5 | 12.0642 | 0.1145 | 0.9580 | |
| RT | 5000 | 5217 | 50 | 11.9497 | | | 1.0434 |
| 85°C | 5000 | 5217 | 42.5 | 11.8311 | −0.1186 | −0.9926 | |

ANGULAR VELOCITY SENSOR

CROSS REFERENCES TO RELATED APPLICATIONS

This application is related to and incorporates by reference Japanese Patent Application No. 2001-113081, which was filed on Apr. 11, 2001.

BACKGROUND OF THE INVENTION

The present invention relates to a vibration type angular velocity sensor in which, when angular velocity is applied, the applied angular velocity is detected based on a change in capacitance between a vibrator and a detecting electrode. The change in capacitance is caused by the vibration of the vibrator.

A related angular velocity sensor has a base, a vibrator, which is supported by the base via a spring portion, and a detecting electrode opposed to the vibrator. This sensor detects angular velocity such that, when angular velocity is applied to the sensor when the vibrator is vibrating in a first direction, which is a driving vibration, the vibrator vibrates in a second direction, which is a detecting vibration that is perpendicular to the first direction, and the applied angular velocity is detected based on a change in capacitance between the vibrator and the detecting electrode.

In such a vibration type angular velocity sensor, as shown in the following mathematical expression A, detecting sensitivity S is proportional to resonance magnification β, which is determined by the resonance frequency (actual vibration frequency of the vibrator) fd in a driving vibration mode, a resonance frequency fs in a detecting vibration mode, and a value Qs in the detecting vibration mode.

$$S \propto \beta = \frac{1}{\sqrt{\left\{1 - \left(\frac{fd}{fs}\right)^2\right\}^2 + \left(\frac{fd}{fs \cdot Qs}\right)^2}}$$

where Qs in expression A is given by the following expression B:

$$Qs = \frac{\sqrt{mk}}{c}$$

in which m is the mass of the vibrator, k is the spring constant of a spring device in the detecting vibration mode, and c is an attenuation coefficient of the vibrator in the detecting vibration mode.

The attenuation coefficient c has temperature characteristics, and when the sensor is operated in the atmosphere, the attenuation coefficient c is increased by the effect of air damping (flow resistance of air) in the vicinity of the vibrator, and thus the detecting sensitivity S varies according to temperature.

The related angular velocity sensor is generally packaged in a vacuum and operated in a vacuum (for example, about 200 Pa) and is thus little affected by air damping. In other words, under such a vacuum, the attenuation coefficient c is reduced to a small value, and thus Qs is large, according to the mathematical expression B. This makes the second term, which includes Qs, in the denominator of mathematical expression A so small that it is negligible, as compared with the first term, and therefore temperature variation in the detecting sensitivity is hardly caused by air damping.

However, producing such a vacuum package presents complicated problems and takes a great amount of time and labor.

SUMMARY OF THE INVENTION

It is an object of the present invention to suppress temperature variation caused by air damping in the detecting sensitivity of a vibration type angular velocity sensor that operates in the atmosphere.

In order to reduce the temperature variation in the detecting sensitivity caused by the air damping, it can be seen from expression A that the rate of change due to the temperature of the resonance magnification β should be reduced. To be more specific, it was found that making the rate of change due to the temperature of the resonance magnification β not larger than 1% in the working temperature range of the sensor (from −40° C. to +85° C.) suppresses the temperature variation, caused by air damping, in the detecting sensitivity to a very small level, at which there is no significant problem in practical use.

It was noticed that the attenuation coefficient c varies according to the temperature and that the effect of the second term $\{fd/(fs \cdot Qs)\}^2$ in the square root symbol of the denominator in mathematical expression A showing the resonance magnification β was to be reduced.

Since the value Qs is essentially determined by the structure of the sensor device (shapes of the vibrator and the detecting electrode), it was decided to control the ratio of the resonance frequency fd in the driving vibration mode to the resonance frequency fs in the detecting vibration mode (hereinafter, fd/fs is referred to as the degree of detuning α).

According to the analysis of the present inventor, the value Qs in the detecting vibration mode varies from +25% to −15% in the working temperature range from −40° C. to +85° C. The degree of detuning α is found by analysis such that the rate of change of the resonance magnification β is suppressed to a value not larger than 1% even if Qs varies from +25% to −15%.

The invention has been made based on the result of this analysis and is characterized in that, in a vibration system having spring devices (33, 34) and a vibrator (31), the degree of detuning α (α=fd/fs), that is, the ratio of a resonance frequency fd in the driving vibration to a resonance frequency fs in the detecting vibration and a Q value in the detecting vibration Qs satisfy the relationship expressed by the following mathematical expression C:

$$\alpha \geq 5.720 \times 10^{-9} \cdot Qs^6 - 1.012 \times 10^{-6} \cdot Qs^5 +$$
$$7.102 \times 10^{-5} \cdot Qs^4 - 2.517 \times 10^{-3} \cdot Qs^3 +$$
$$4.736 \times 10^{-2} \cdot Qs^2 - 4.549 \times 10^{-1} \cdot Qs + 2.923$$

If α and Qs satisfy the above relationship, the rate of change in the resonance frequency β is no larger than 1% in the working temperature range of the sensor from −40° C. to +85° C. Therefore, it is possible to provide a vibration type angular velocity sensor in which temperature variation in the detecting sensitivity caused by air damping is suppressed to a very small level such that there is no significant problem in practical use when the sensor is operated in the atmosphere.

Further, according to another aspect of the invention, in minimizing the rate of change, due to temperature variation, of the resonance magnification β, it was found that, in expression A, the first term $\{1-(fd/fs)^2\}^2$ in the square root symbol of the denominator should be no smaller than 100 times the second term $\{fd/(fs \cdot Qs)\}^2$.

In another aspect, the invention is characterized in that, in a vibration system having the spring devices (33, 34) and the vibrator (31), the degree of detuning α and Qs satisfy the relationship expressed by the following expression D:

$$\alpha^4 - (2+100/Qs^2) \times \alpha^2 + 1 \geq 0$$

Also according to this relationship, temperature variation, caused by air damping, in the detecting sensitivity can be reduced to the extent that there is no significant problem in practical use when the vibration type angular velocity sensor is operated in the atmosphere.

The opposed portions of the detecting electrode and the vibrator can be made such that the detecting electrode (40) has a comb-like part, and the vibrator (31) has a comb-like part (35), and teeth, or projections, of the two comb-like parts are opposed to and interdigitated with each other.

Further, the base (20), the spring devices (33, 34), the vibrator (31) and the detecting electrode (50) are formed of semiconductor material.

The reference numerals in the parentheses above are exemplary and correspond to specific parts described below.

BRIEF DESCRIPTION OF THE DRAWINGS

FIG. 3 is a table showing the degree of detuning α when the rate of change of α is not larger than 1% where Qs varies as shown.

DESCRIPTION OF THE PREFERRED EMBODIMENTS

First Embodiment

Figure 2:
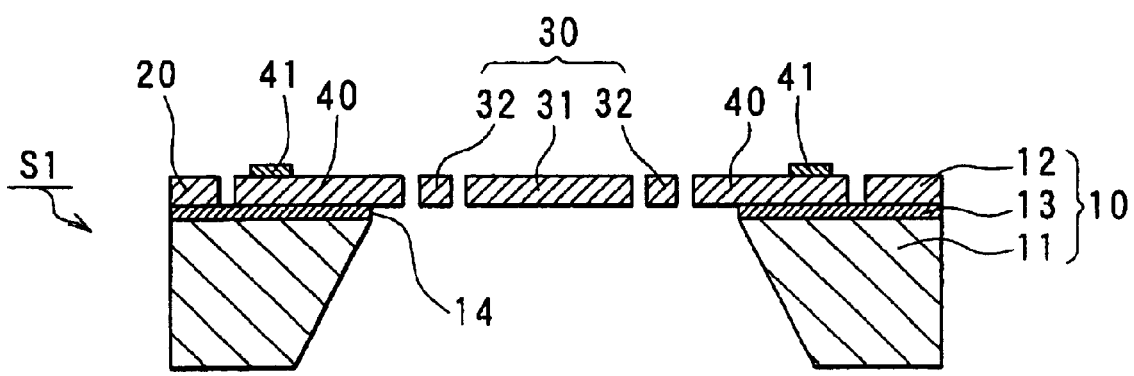
FIG. 2 is a cross-sectional view taken along a line 2—2 in FIG. 1.

The angular velocity sensor S1 is formed by subjecting a semiconductor substrate to a known micromachining process. The semiconductor substrate forming the sensor S1, as shown in FIG. 2, is a rectangular SOI (silicon on insulator) substrate 10 made of a first silicon substrate 11, or a first semiconductor layer, and a second silicon substrate 12, or a second semiconductor layer, which is bonded to the first substrate 11 with an oxide film 13, which is an insulating film.

The second silicon substrate 12 is subjected to etching to form trenches, which partition the substrate 12 into a frame shaped base 20, which is located at the peripheral portion of the second silicon substrate 12, and a moving portion 30, which is movable and located inside the base 20.

At a location corresponding to the moving portion 30, the first silicon substrate 11 and the oxide film 13 are removed to form an opening 14. The base 20 is supported by the first silicon substrate 11 at the edge of the opening 14 by the oxide film 13.

The moving portion 30 includes the first moving part 31, or the vibrator, and a pair of second moving parts 32, or side members. The vibrator 31 is substantially rectangular and is located in the center of the second silicon substrate 12. Each side member 32 is shaped like a beam and formed on a respective side of the vibrator 31.

Each side member 32 is connected to and supported by the base 20 by a pair of driving beams 33. Each driving beam is substantially U-shaped with square corners. The vibrator 31 is connected to the side members 32 by detecting beams 34. Thus, the vibrator 31 is supported by the base 20.

Each driving beam 33 is flexible substantially only in the x direction, and the moving portion 30 can be vibrated in the x direction due to the flexibility of the driving beams 33. On the other hand, the detecting beam 34 has flexibility substantially only in the y direction and the vibrator 31 of the moving portion 30 can be vibrated in the y direction due to the flexibility of the detecting beam 34. The driving beams 33 and the detecting beams 34 form spring devices.

A driving electrode 40 is located on each side of the moving portion 30 in the second silicon substrate. Each driving electrode 40 has a comb-like part with inwardly extending teeth, or projections, and each driving electrode 40 is supported at the edge of the opening 14 as shown in FIG. 2. Each driving electrode 40 applies a periodic signal (driving signal) to the moving portion 30 from an external circuit (not shown) to vibrate, or drive, the moving portion 30 in the x direction.

Figure 1:
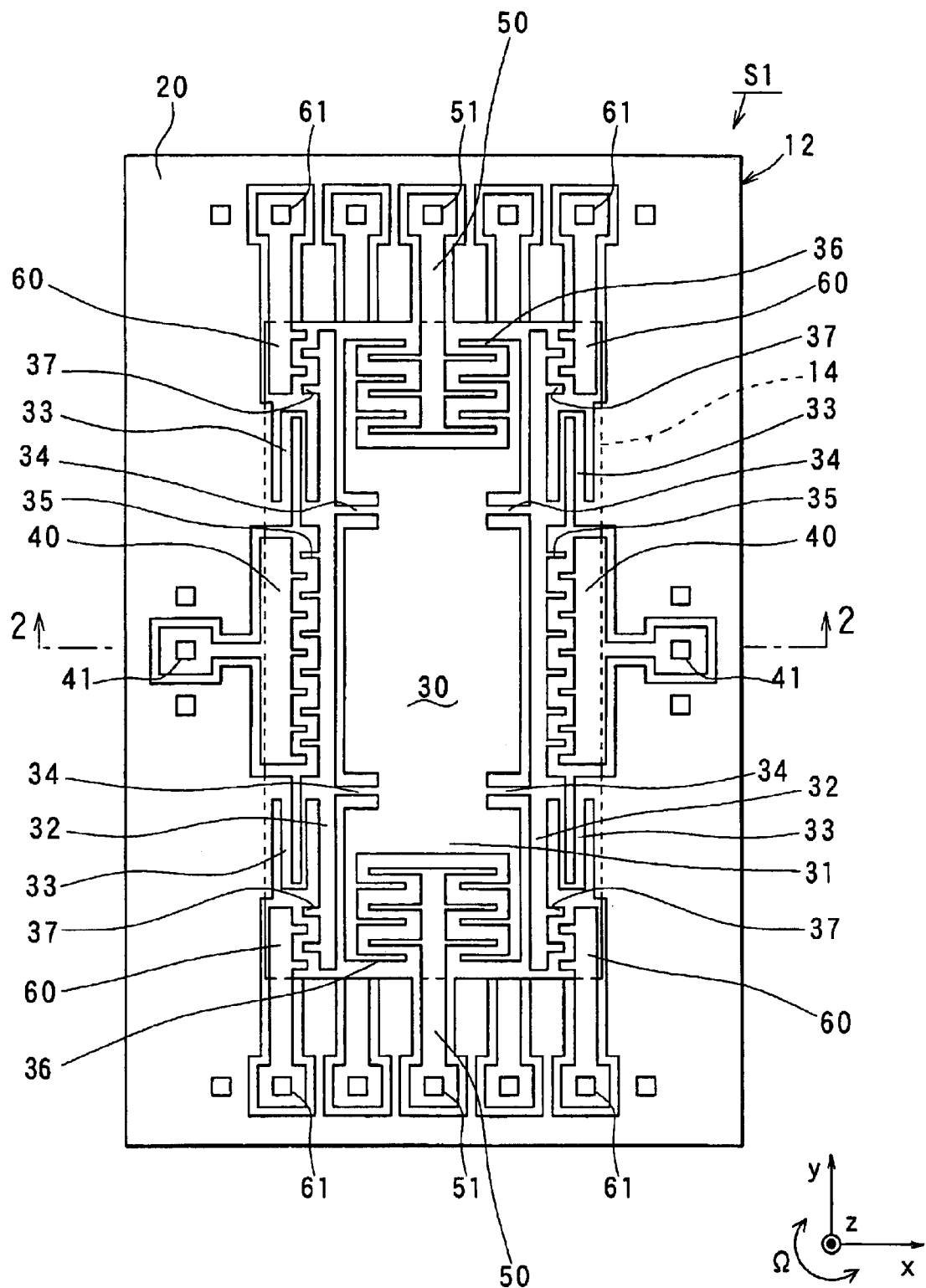
FIG. 1 is a plan view showing an angular velocity sensor in accordance with the first embodiment of the present invention.

Each driving electrode 40 is arranged opposite to a comb-like part of a corresponding one of the side members 32. Each comb-like part 35 of the side members 32 has teeth, or projections, that extend outwardly such that the teeth of the driving electrodes 40 are opposed to and alternate with the teeth of the comb-like parts 35 as shown in FIG. 1. That is, the teeth of the opposed comb-like parts are interdigitated. A pad 41 is formed on each driving electrode 40 for electrically connecting the corresponding driving electrode 40 to the external circuit by wire bonding or the like. Each pad 41 is formed of aluminum or the like.

Further, on both ends, respectively, of the vibrator 31 of the second silicon substrate 12 are detecting electrodes 50, each of which has comb-like parts and is supported at the edge of the opening 14.

The detecting electrodes 50 are provided to output a change in capacitance based on the vibration (detecting vibration) in the y direction of the vibrator 31 to the external circuit. The change in capacitance serves as a detecting signal for representing angular velocity Ω. A change in capacitance is generated when an angular velocity Ω is applied around the z axis when the moving portion 30 (vibrator 31 and the side members 32) is being driven, or vibrated, in the x direction.

Each detecting electrode 50 is arranged opposite to a comb-like part 36 that extends from the vibrator 31. The comb-like parts of the detecting electrodes have outwardly extending teeth, and the comb-like parts of the vibrator 31 have inwardly extending teeth, and the teeth of the respective comb-like parts are interdigitated as shown. A pad 51 is formed on each detecting electrode 50 for electrically connecting the corresponding detecting electrode 50 to the external circuit by wire bonding or the like. Each pad 51 is formed of aluminum or the like.

Further, near the ends of the side members 32 of the second silicon substrate 12 are formed monitor electrodes 60, which are comb-like and have teeth. Each monitor electrode is supported at the edge of the opening 14. The monitor electrodes 60 monitor the driving vibration in the x direction of the moving portion 30 and output a monitor signal to the external circuit.

Each monitor electrode 60 is arranged opposite to a comb-like end 37 of a corresponding one of the side members 32. The comb-like ends have outwardly extending teeth, and the monitor electrodes have inwardly extending teeth, and the teeth of the respective comb-like parts are opposed and interdigitated as shown in FIG. 1. A pad 61 is formed on each monitor electrode 60 for electrically connecting the monitor electrode 60 to the external circuit by wire bonding or the like. Each pad 61 is formed of aluminum or the like.

The parts formed on the second silicon substrate 12, such as the base 20, the moving portion 30, the driving electrodes 40, the detecting electrodes 50 and the monitor electrodes 60, are electrically insulated from each other by the trenches.

In such an angular velocity sensor S1, a periodic driving signal (input signal) such as sine wave voltage, rectangular wave voltage, or the like, is applied to the driving electrodes 40 through the pads 41 of the driving electrodes from the external circuit to generate electrostatic forces between the comb-like parts 35 and the driving electrodes 40, such that the moving portion 30, which includes the vibrator 31, is driven to vibrate in the x direction, which is permitted by the flexibility of the driving beams, or spring device 33.

By determining the change in capacitance between the teeth of comb of the monitor electrode 60, the frequency and the amplitude of the driving vibration of the moving portion 30 can be monitored. Then, the monitored change in capacitance is fed back as a monitor signal to the external circuit from the pads 61, and the driving signal is adjusted by a self-excited circuit to vibrate the moving portion 30, including the first moving portion (vibrator) 31, in a normal driving vibration.

When an angular velocity $\Omega$ is applied around the z axis when the moving portion 30 is vibrating (in the x direction) in the driving vibration, a Coriolis force is applied to the moving portion 30 in the y direction, which causes a detecting vibration the first moving portion (vibrator) 31 of the moving portion 30. The detecting vibration changes the capacitance between the teeth of the comb-like part of the detecting electrode 50, and the change in capacitance is outputted to and detected by the external circuit to determine the magnitude of the angular velocity $\Omega$.

When the vibrator 31 is vibrating in the x direction (in the driving vibration), the actual driving vibration frequency is the vibration frequency fd (hereinafter referred to as a driving resonance frequency fd) of the vibrator 31 in the x direction, and the vibrator 31 and the side member 32 vibrate together at the driving resonance frequency fd (for example, 5000 Hz) during the driving vibration.

In the detecting vibration, in the y direction, when the angular velocity $\Omega$ is applied, the detecting vibration of the vibrator 31 occurs at the same driving resonance frequency fd (for example, 5000 Hz).

The resonance frequency fs (hereinafter referred to as the detecting resonance frequency fs) of the vibrator 31 in the y direction is designed to be larger (for example, 9650 Hz) than the driving resonance frequency fd. In other words, the vibrator 31, in the detecting vibration, vibrates at a frequency fd, which is smaller than the detecting resonance frequency fs. When the vibrator 31 is vibrated in the detecting vibration at the same frequency fd as the driving frequency fd, the amplitude of the detecting vibration is increased by making fd smaller than fs (fd<fs) to increase sensitivity.

For this reason, although it may be thought that letting fd=fs is recommendable, in this case, β=Qs, from expression A, and the temperature variation in the detecting sensitivity is significantly increased by the effect of air damping. That is, in expression B, the effects of the mass m of the vibrator 31 and the spring constant k of the spring device (detecting beams 34) in the detecting vibration mode are smaller than the effect of the attenuation coefficient c, and a change in the attenuation coefficient C, which is the temperature variation component in Qs, directly affects the resonance magnification β.

Thus, in order to reduce the temperature variation, caused by air damping, in the detecting sensitivity to a very small level at which there is no significant problem in practical use, the ratio of the driving resonance frequency fd to the detecting resonance frequency fs, that is, fd/fs (the degree of detuning α) is controlled such that a rate of change of the resonance magnification β is reduced to a value not larger than 1% in the working temperature range of the sensor S1 of from −40° C. to +85° C.

According to the analysis by the present inventor, in the sensor S1, the value Qs in the detecting vibration mode varies from +25% to −15% in the working temperature range of from −40° C. to +85° C. The degree of detuning α is determined by analysis to suppress the rate of change of the resonance magnification β to a value not larger than 1% even if Qs varies from +25% to −15% for various values of Qs. One example of the result of such analysis will be shown in FIG. 3.

FIG. 3 is a table for determining the degree of detuning α and the detecting resonance frequency fs when the rate of change of β is not larger than 1% and the driving resonance frequency fd is 5000 Hz in cases where Qs is 3, 6, 10, 20, 30, and 50 at room temperature. These values of Qs are reasonable values that can be determined by the structure of the present sensor S1.

For example, in FIG. 3, when Qs is 3 at room temperature, Qs at a temperature of −40° C. is 3.75, which varies by +25% from Qs at room temperature, and Qs at a temperature of +85° C. is 2.55 which varies by −15%. The rate of change of β is determined by the difference (Δβ) between β for Qs at the limit temperature and β for Qs at room temperature, and the degree of detuning α (α=fd/fs) when the rate of change of β is not larger than 1% can be calculated from expression A.

When Qs is 3 at room temperature, the degree of detuning α is 1.93. Similarly, the degrees of detuning α when the rate of change of β is not larger than 1% are determined for other values of Qs. Further, it can be seen from FIG. 3 that, as Qs increases, the degree of detuning α can be made closer to 1 and the resonance magnification β increases.

Here, the respective degrees of detuning α shown in FIG. 3 are those when the rate of change of β is not larger than 1% and gets as close to 1% as possible. For this reason, in FIG. 3, for example, when Qs is 3 at room temperature, if the degree of detuning α is not smaller than 1.93, the rate of change of β is not larger than 1%. When Qs is as small as 3 or 5 at room temperature, if the degree of detuning α is 1, the rate of change of β becomes 10 to 20%.

Figure 4:
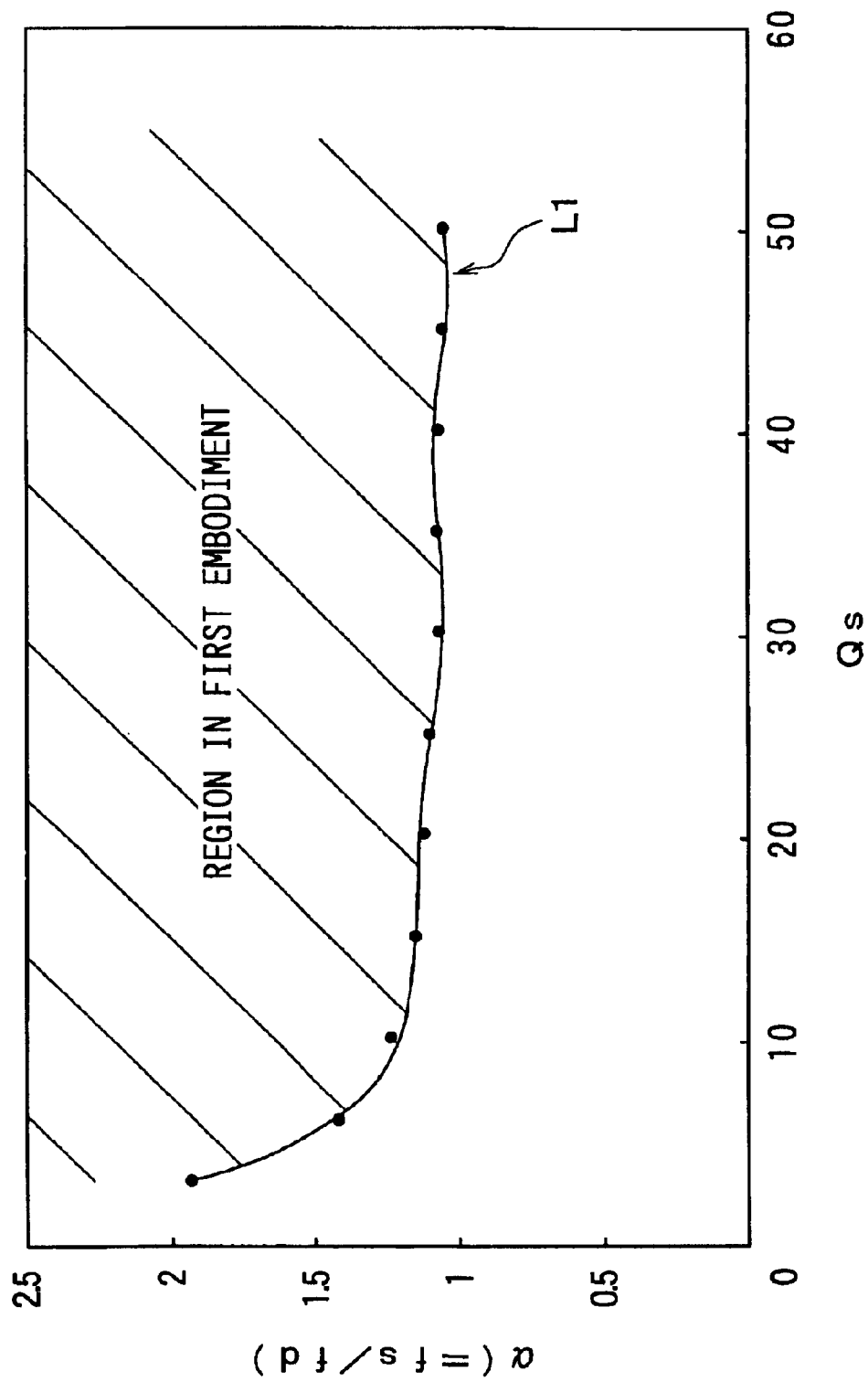
FIG. 4 is a graph showing the relationship between the degree of detuning α and Qs when the rate of change of β is not larger than 1%.

FIG. 4 is a graph to show the relationship between the respective Qs values in FIG. 3 and the determined degree of detuning α. That is, the rate of change of β is no larger than 1% in the hatched region above a curved line L1 in the graph shown in FIG. 4. The hatched region above the curved line L1 in the graph is expressed by the following inequality, or expression C:

$$\alpha \geq 5.720 \times 10^{-9} \cdot Qs^6 - 1.012 \times 10^{-6} \cdot Qs^5 +$$
$$7.102 \times 10^{-5} \cdot Qs^4 - 2.517 \times 10^{-3} \cdot Qs^3 +$$
$$4.736 \times 10^{-2} \cdot Qs^2 - 4.549 \times 10^{-1} \cdot Qs + 2.923$$

The angular velocity sensor S1 of the present embodiment satisfies the inequality of expression C. By determining a desired Qs, the degree of detuning α can be found from the above mathematical expression C and when the degree of detuning α is determined, since the driving resonance frequency fd is determined, the detecting resonance frequency fs can be determined. For example, when Qs is 3 at room temperature, if the degree of detuning α is determined to be 1.93, the detecting resonance frequency fs becomes 9650 Hz.

When the angular velocity sensor S1 is designed, first, the shape of the sensor S1 is determined and the thickness and lengths of the driving beam 33 the detecting beam 34 are chosen so that the resonance frequencies fd, fs are those determined in the above manner and to determine the spring constant k and the sizes (masses m) of the first and the second moving portions 31 and 32. Accordingly, the angular velocity sensor S1 satisfies the relationship shown by expression C.

After designing the angular velocity sensor S1 in this manner, the angular velocity sensor S1 can be manufactured by known semiconductor device manufacturing methods. For example, the SOI substrate 10 is prepared and then trenches for defining the pads 41 and the like, the base 20 and the moving portion 30 are formed on the second silicon substrate 12 by photolithography, dry etching or the like. The first silicon substrate 11 is anisotropically etched to form the opening 14 to complete the angular velocity sensor S1.

As described above, according to the present invention, by determining α and Qs so that they satisfy the relationship shown by expression C, the rate of change in the resonance magnification β is made no larger than 1% in the working temperature range of the sensor S1 (from −40° C. to +85° C.), so that temperature variation, caused by the air damping, in the detecting sensitivity is reduced to a level at which there are no significant problems in practical use when the vibration type angular velocity sensor is operated in the atmosphere.

Second Embodiment

Further, in the angular velocity sensor S1, in order to reduce the rate of change caused by temperature variation of the resonance magnification β such that the temperature variation, caused by the air damping, in the detecting sensitivity is reduced to an acceptable level, it is recommended that, in expression A, the first term $\{1-(fd/fs)^2\}^2$ in the square root symbol of the denominator be no smaller than 100 times the second term $\{fd/(fs \cdot Qs)\}^2$.

For this purpose, first, the following expression D needs to be satisfied.

$$\{1-(fd/fs)^2\}^2 \geq 100 \times \{fd/(fs \cdot Qs)\}^2$$

where, since α=fs/fd, the expression D is transformed in sequence into expressions E, F, and G to finally obtain the inequality shown by expression H.

Expression E $$\{1-(1/\alpha)^2\}^2 > 100 \times \{1/(\alpha \cdot Qs)\}^2$$

Expression F $$1 - 2/\alpha^2 + 1/\alpha^4 \geq 100/(\alpha^2 \cdot Qs^2)$$

Expression G $$1/\alpha^4 - 1/\alpha^2 \times (2 + 100/Qs^2) + 1 \geq 0$$

Expression H $$\alpha^4 - (2 + 100/Qs^2) \times \alpha^2 + 1 \geq 0$$

In the angular velocity sensor S1 in accordance with the second embodiment, the degree of detuning α and Qs satisfy the relationship shown by expression H in the vibration system constituted by the spring devices 33, 34 and the vibrator 31.

Figure 5:
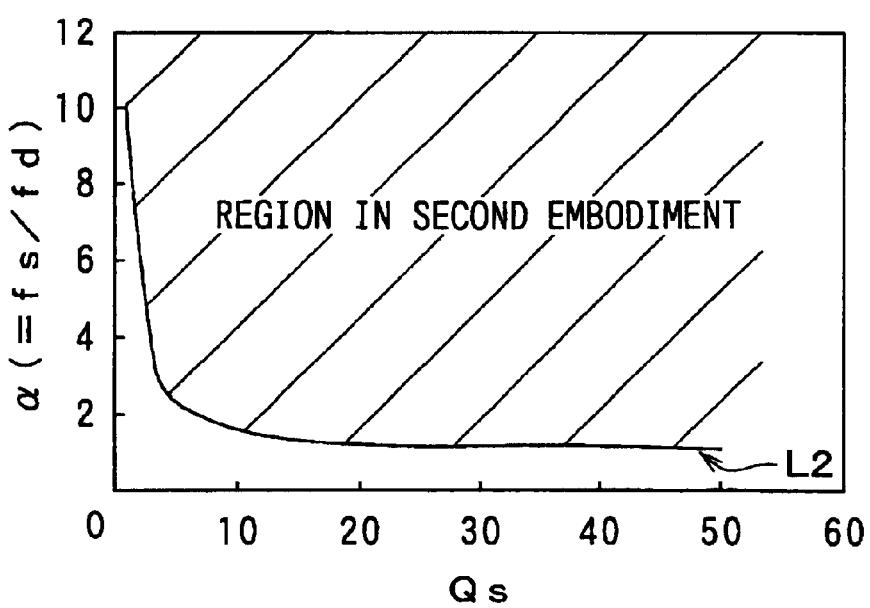
FIG. 5 is a graph showing the relationship between the degree of detuning α and Qs in the second embodiment of the present invention.

FIG. 5 is a graph that illustrates the relationship of expression H. In FIG. 5, the hatched region (including the curved line L2) is the region of the inequality shown by expression H. In this region, the first term in the square root symbol of the denominator in the mathematical expression A can be no smaller than 100 times the second term, and thus, the second term that includes the attenuation coefficient c can be neglected. Therefore, the temperature variation, caused by the air damping, in the detecting sensitivity can be reduced to an acceptable level when the vibration type angular velocity sensor is operated in the atmosphere.

Also, if Qs is determined as desired, the degree of detuning α can be found from expression H, and then the angular velocity sensor S1 can be designed and manufactured in the manner of the first embodiment.

What is claimed is:

1. An angular velocity sensor comprising:

a base;

a vibrator;

a spring device for connecting the vibrator to the base such that a driving vibration can be applied to the vibrator in a first direction and such that the vibrator produces a detecting vibration in a second direction, which is perpendicular to the first direction; and a detecting electrode opposed to the vibrator, wherein, when an angular velocity is applied to the sensor while the vibrator receives the driving vibration, a change in capacitance between the vibrator and the detecting electrode is produced as a result of the detecting vibration, and the detecting electrode permits the change in capacitance to be detected, wherein a degree of detuning α is expressed by fd/fs, where fd is a resonance frequency of the driving vibration and fs is a resonance frequency in the detecting vibration, and a term Qs, which is expressed by $(m \cdot k)^{1/2}/c$, where m is the mass of the vibrator and k is the spring constant of the spring device, and c is an attenuation coefficient of the vibrator, satisfy a relationship expressed by the following expression:

$$\alpha \geq 5.720 \times 10^{-9} \cdot Qs^6 - 1.012 \times 10^{-6} \cdot Qs^5 +$$
$$7.102 \times 10^{-5} \cdot Qs^4 - 2.517 \times 10^{-3} \cdot Qs^3 +$$
$$4.736 \times 10^{-2} \cdot Qs^2 - 4.549 \times 10^{-1} \cdot Qs + 2.923$$

2. An angular velocity sensor according to claim 1, wherein the base, the spring device, the vibrator, and the detecting electrode are made of semiconductor material.

3. An angular velocity sensor according to claim 1, wherein the detecting electrode has a plurality of projections, and the vibrator has a plurality of projections, and the projections of the detecting electrode are opposed to and interdigitated with the projections of the vibrator.

4. An angular velocity sensor according to claim 3, wherein the base, the spring device, the vibrator, and the detecting electrode are made of semiconductor material.

* * * * *